(12) United States Patent
Odell et al.

(10) Patent No.: US 8,123,347 B2
(45) Date of Patent: Feb. 28, 2012

(54) METHOD OF FORMING IMAGES USING CURABLE INK WITH GELLANT

(75) Inventors: Peter G. Odell, Mississauga (CA); Jennifer L. Belelie, Oakville (CA); Naveen Chopra, Oakville (CA); Michelle N. Chretien, Mississauga (CA); Barkey Keoshkerian, Thornhill (CA); Richard P. N. Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 12/394,788

(22) Filed: Feb. 27, 2009

(65) Prior Publication Data
US 2010/0221510 A1      Sep. 2, 2010

(51) Int. Cl.
*B41J 2/01* (2006.01)

(52) U.S. Cl. .................. 347/102; 347/100; 347/101

(58) Field of Classification Search .................. 347/100, 347/103, 88, 99, 102, 101, 95, 96; 106/31.6, 106/31.13; 523/160, 161
See application file for complete search history.

(56) References Cited

U.S. PATENT DOCUMENTS
5,195,430 A      3/1993  Rise
(Continued)

OTHER PUBLICATIONS

European Search Report for Appln No. EP 10 15 2462, mailed Jun. 16, 2010.
(Continued)

*Primary Examiner* — Manish S Shah
(74) *Attorney, Agent, or Firm* — Oliff & Berridge, PLC

(57) ABSTRACT

Disclosed herein are methods of using inks with gellants, that can form a gel state, as receivers for particle materials. The inks are liquid when jetted, but quickly enter a tacky/semi-solid/gel state when cooled below ink gel temperature on a substrate and prior to curing. Dry powders and solid particulate substances of various types are then applied to the jetted inks and locked in place when the ink is cured.

19 Claims, No Drawings

U.S. PATENT DOCUMENTS

| | | |
|---|---|---|
| 5,389,958 A | 2/1995 | Bui et al. |
| 6,787,658 B2 | 9/2004 | Cyr et al. |
| 6,870,062 B2 | 3/2005 | Cyr et al. |
| 6,870,063 B2 | 3/2005 | Cyr et al. |
| 7,276,614 B2 | 10/2007 | Toma et al. |
| 7,279,587 B2 | 10/2007 | Odell et al. |
| 2004/0001973 A1 | 1/2004 | Gao et al. |
| 2004/0018318 A1 | 1/2004 | Weikard et al. |
| 2004/0142995 A1 | 7/2004 | Cyr et al. |
| 2007/0120908 A1 | 5/2007 | Odell et al. |
| 2007/0120909 A1 | 5/2007 | Belelie et al. |
| 2007/0120921 A1 | 5/2007 | Carlini et al. |
| 2007/0120925 A1 | 5/2007 | Belelie et al. |
| 2007/0123601 A1 | 5/2007 | Belelie et al. |
| 2007/0123606 A1 | 5/2007 | Toma et al. |
| 2007/0211110 A1 | 9/2007 | Iftime et al. |
| 2007/0254978 A1 | 11/2007 | Odell et al. |
| 2008/0000384 A1* | 1/2008 | Belelie et al. .............. 106/31.13 |
| 2008/0122914 A1 | 5/2008 | Toma et al. |
| 2008/0128570 A1 | 6/2008 | Chen |
| 2009/0321676 A1* | 12/2009 | Breton et al. .............. 252/62.53 |

OTHER PUBLICATIONS

U.S. Appl. No. 12/146,967, filed Jun. 26, 2008.

"Dimer Acids", Kirk-Othmer, Kirk-Othmer Encyclopedia of Chemical Technology, vol. 8, 4$^{th}$ Ed. (1993), pp. 223-237.

Office Action issued in Canadian Application No. 2,693,634 mailed Oct. 4, 2010.

* cited by examiner

METHOD OF FORMING IMAGES USING CURABLE INK WITH GELLANT

BACKGROUND

Disclosed herein are inks with gellants, that can form a gel state, used as receivers for particle materials. The inks are liquid when jetted, but quickly enter a tacky/semi-solid/gel state when cooled below the ink gel temperature on a substrate and prior to curing. Dry powders of various types can be applied to the inks and then can be locked in place when the ink is cured.

Also disclosed herein are methods for producing an image on a substrate using the curable inks as receivers for particle materials.

Magnetic ink character recognition, or MICR, documents and inks are known. Such inks are generally employed in the printing and preparation of security documents, or documents that require a secure feature, such as checks. Conventional ink-jet inks contain a dye or pigment, a solvent system, which may be aqueous or non-aqueous in nature, and may include a combination of solvents or a single solvent, and various other components. These other components may be included to address specific problems relating to ink performance, such as flow characteristics, the ink drying out over time as it sits in the cartridge or when it is deposited on the nozzle during printing, particulate matter in the ink settling out of solution over time, and the like.

Of particular interest are those inks which contain a magnetic pigment or component in an amount sufficient to generate a magnetic signal strong enough to be MICR-readable. Such inks generally fall into the category of magnetic inks in general, and in the more specific sub-category of MICR-readable inks. Using commonly-known thermal ribbon printing techniques, the ink is used to print all or a portion of a document, such as checks, bonds, security cards, and the like; for example, most checks exhibit an identification code area, usually at the bottom of the check. The characters of this identification code are usually MICR encoded. The document with MICR-readable ink is then exposed to an appropriate source or field of magnetization, at which time the magnetic particles accept and retain a magnetic signal. The document can then be authenticated by passing it through a reader device which detects the magnetic signal of the MICR imprinted characters, or "reads" the signal, in order to authenticate or validate the document. Of particular importance in the foregoing is the ability of the magnetic component of the ink to retain a sufficient magnetic signal such that the printed characters retain their readable characteristic and are easily detected by the detection device or reader. The magnetic signal retained by the pigment or magnetic component is known as "remanence". As might be expected, this characteristic tends to increase with particle size and with the density of the coating of the magnetic pigment.

In the past, thermal ribbon printing mechanisms were used to generate MICR-readable characters or indicia. In this printing technique, the particle size and density of the magnetic pigment or particulate was not a limiting factor because the magnetic component was retained on a ribbon substrate by a binder and/or wax material. Then, upon application of heat and pressure, the magnetic ink was transferred to a substrate. However, the incorporation of such magnetic pigments or particulates into an aqueous or non-aqueous liquid ink presents a new set of considerations. For example, the pigment, which had generally previously been used in the form of pigment or particulate matter of a larger size, exhibited a correspondingly high density, and was thus difficult to maintain in suspension or dispersion within a liquid ink composition. Consequently, it became necessary to reduce the particle size of the magnetic pigment or particulate. However, reducing the particle size brought about a corresponding reduction in the magnetic charge or remanence of the magnetic component. In addition to the foregoing, one wishing to prepare a liquid MICR inkjet ink must also take into consideration the fact that most, if not all, inkjet printers limit considerably the particle size of any particulate components of the ink, due to the very small size of the inkjet print head nozzle which expels the ink onto the substrate.

Piezoelectric inkjet techniques are known, and offer a reliable and cost-effective means of applying digital images. However, inkjet inks and substances capable of being deposited on a substrate through ink jetting currently are required to have a small particle size and a low solid particle content. Large particles and high loadings make it difficult to combine such solid particles to ink jet technology, especially solvent free inkjet applications, as the size impedes normal function of the jetting nozzles and other equipment by, for example, clogging or requiring that their diameter be so large as to prevent accurate printing.

Current MICR technology relies on large particles, microns in length, and high loadings, 25-50 weight percent (wt %), to provide a robust signal for the reader.

Additional similar problems exist with forming an image on a substrate from substances including sizable particles. Image formation with substances having high loading also faces similar difficulties in translation to inkjet technology.

Copending Application U.S. Ser. No. 12/146,967, filed Jun. 26, 2008, the disclosure of which is incorporated herein by reference in its entirety, relates to a MICR inkjet ink comprising stabilized magnetic single-crystal nanoparticles, wherein the absolute value of the magnetic anisotropy of the magnetic nanoparticles |K1| is greater than or equal to $2 \times 10^4$ $J/m^3$. The magnetic nanoparticle may be a ferromagnetic nanoparticle, such as FePt. The ink includes a magnetic material that minimizes the size of the particle, resulting in excellent magnetic pigment dispersion and dispersion stability, particularly in non-aqueous inkjet inks. The smaller-sized magnetic ink particles also maintain excellent magnetic properties, thereby reducing the amount of magnetic particle loading required in the ink.

A need has remained for a method for economically and efficiently allowing incorporation of magnetic or large particles with inexpensive and accurate ink jetting image formation processes.

Copending U.S. Application Publication No. 2007/0123606, the disclosure of which is incorporated herein by reference in its entirety, discloses a phase change ink comprising a colorant, an initiator, and a phase change ink carrier.

Copending U.S. Application Publication No. 2007/0123601, the disclosure of which is incorporated herein by reference in its entirety, discloses a phase change, curable composition comprising a curable monomer, photoinitiator that initiates polymerization of the curable monomer, and a phase change agent that provides the composition with an increase in viscosity of at least four orders of magnitude.

Copending U.S. Application Publication No. 2007/0254978, the disclosure of which is incorporated herein by reference in its entirety, discloses ink vehicles including at least one curable component, and optionally including initiating agents, colorants, non-curable components and other additives.

Copending U.S. Application Publication No. 2004/0018318 discloses a curable coating composition containing at least one component having (meth)acryloyl groups that is polymerized with radiation.

Copending U.S. Application Publication No. 2008/0122914 discloses an ink vehicle including different first and second co-monomers, and a gellant that includes a curable epoxy-polyamide composite gellant.

Copending U.S. Application Publication No. 2008/0000384 discloses a radiation curable phase change ink comprising an ink vehicle that includes at least one curable carrier, at least one gellant, at least one curable wax, and at least one photoinitiator.

Copending U.S. Application Publication No. 2007/0120921 discloses a radiation curable phase change ink including at least one curable epoxy-polyamide gellant and at least one colorant.

Copending U.S. Application Publication No. 2007/0120908 discloses a phase change ink having a viscosity of from about 4 mPa's to about 50 mPa's at a first temperature, and having a viscosity of from about $10^4$ mPa's to about $10^9$ mPa's at second temperature, when the second temperature is at least 10° C., but no more than 50° C., below the first temperature.

SUMMARY

Disclosed herein is a method of forming an image, comprising forming a pattern of the image on a substrate by jetting a curable ink containing a gellant onto the substrate, wherein the ink at jetting is at a temperature above a gel temperature of the ink, cooling the ink of the pattern to below the gel temperature of the ink, following the cooling, applying at least one particle material to the formed pattern of the ink, and, following the applying, curing the ink.

Also disclosed herein is a method of forming an image that is readable with a MICR reading machine comprising forming a pattern of an image on a substrate by jetting a curable ink containing a gellant onto the substrate, wherein the ink at jetting is at a temperature above a gel temperature of the ink, cooling the ink of the pattern to below the gel temperature of the ink, following the cooling, applying a magnetic particle material to the formed pattern of the ink, and, following the applying, curing the ink.

Further disclosed herein is a system for forming an image on a substrate comprising an ink jet device, followed in line by a device to apply particles and remove excess particles, followed in line by a device to effect cure of ink.

DETAILED DESCRIPTION

It has been found that in an uncured state, inks containing gellants on a substrate, for example paper, Mylar, cardboard, particle board, card paper, plastic, metal, a metal alloy, or a treated substrate, are a good receptacle for magnetic particles or other large particles, for example particles having a size of about 250 nanometers or larger, that are currently difficult to jet. The particle materials applied onto a substrate will stick to the gelled ink in high concentration while freely falling off areas of the substrate with no ink. The advantage to such a process is it allows the formation of the image with the ink on the substrate precisely and rapidly via conventional jetting, while still allowing an image including unjettable pigments or particles to be formed conveniently with post-jetting application of particle materials to a receptive material.

As used herein, "ink" refers to any material jetted by an ink jet. The ink includes at least one gellant, and may be comprised solely of gellant. That is, the vehicle of the ink may comprise gellant only, or gellant mixed with other vehicle components as discussed herein. The ink may or may not contain colorants such as pigments or dyes.

In embodiments, the curable inks are jetted onto a substrate and then coated or impregnated with particle materials of size or shape incapable of efficient inkjetting.

In embodiments, magnetite powder, metallic or other specialty pigments, or white pigments comprise the particle materials added to the jetted ink.

In embodiments, the curable ink is heated after addition of the particle materials to further drive the particle materials into the ink.

In embodiments, the particle materials are sealed within the ink by the additional of another layer of curable ink by jetting.

In embodiments, the particle materials are removed from the portions of the substrate not coated with curable ink through the use of magnetic pickup, physical agitation, application of forced air, or other techniques known.

In embodiments, the particle materials are sealed within the ink after application by curing the ink. Curing can be effected using any technique appropriate for the ink vehicle used, and may include, for example, UV curing, other radiation curing, e-beam curing, and the like.

Curing herein refers to, for example, the curable materials in the ink undergoing an increase in molecular weight upon exposure to actinic radiation, such as crosslinking, chain lengthening, or the like.

Radiation curable as used herein is intended to cover all forms of curing upon exposure to a radiation source, including (but not limited to) light and heat sources and including in the presence or absence of initiators. Examples of radiation curing include ultraviolet (UV) light, for example having a wavelength of from about 200 to about 400 nanometers, visible light, or the like, optionally in the presence of photoinitiators and/or sensitizers, e-beam radiation, optionally in the presence of photoinitiators, thermal curing, optionally in the presence of high temperature thermal initiators (and which may be largely inactive at the jetting temperature when used in phase change inks), and appropriate combinations thereof.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges.

The radiation curable phase change inks generally comprise at least one curable monomer, at least one phase change agent or gellant, and an optional colorant. They may further comprise at least one photoinitiator that initiates polymerization of the curable monomer. Exemplary phase change inks suitable for use include those described in U.S. Pat. Nos. 7,276,614 and 7,279,587 and U.S. Patent Application Publication Nos. 2007/0120908; 2007/0120909; 2007/0120925 and 2008/0128570, the entire disclosures of which are hereby fully incorporated herein by reference.

The ink vehicle may include at least one curable monomer. Examples of suitable monomer materials include propoxylated neopentyl glycol diacrylate, such as SR9003, commercially available from Sartomer Co. Inc., isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

Any curable ink containing gellants may be usable. The gellant may include compounds of the formula

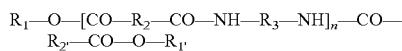

wherein:

$R_1$ and $R_{1'}$ each, independently of the other, is:

(i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

$R_2$ and $R_{2'}$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like either may or may not be present in the alkylene group), in one embodiment with at least 2 carbon atoms, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, and in yet another embodiment with at least about 36 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, (ii) arylene groups (wherein an arylene group is defined as a divalent aromatic group or aryl group, including substituted and unsubstituted arylene groups, and wherein hetero atoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, wherein the substituents on the substituted alkylene, arylene, arylalkylene, and alkylarylene groups can be pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, thiocyanato groups, carboxylate groups, urethane groups, urea groups, mixtures thereof, and the like, wherein two or more substituents can be joined together to form a ring;

$R_3$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like either may or may not be present in the alkylene group), in one embodiment with at least 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges, (ii) an arylene group (wherein an arylene group is defined as a divalent aromatic group or aryl group, including substituted and unsubstituted arylene groups, and wherein hetero atoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 18 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, wherein the substituents on the substituted alkylene, arylene, arylalkylene, and alkylarylene groups can be pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, carboxylate groups, urethane groups, urea groups, mixtures thereof, and the like, wherein two or more substituents can be joined together to form a ring;

and n is an integer representing the number of repeat amide units, being in one embodiment at least 1, and in one embodiment no more than about 20, in another embodiment no more than about 15, and in yet another embodiment no more than about 10, although the value of n can be outside of these ranges.

In one specific embodiment, $R_1$ and $R_{1'}$ are the same as each other; in another specific embodiment, $R_1$ and $R_{1'}$ are different from each other. In one specific embodiment, $R_2$ and $R_{2'}$ are the same as each other; in another specific embodiment, $R_2$ and $R_{2'}$ are different from each other. In one specific embodiment, $R_1$ and $R_{1'}$ are the same as each other and $R_2$ and $R_{2'}$ are the same as each other.

In one specific embodiment, $R_1$ and $R_{1'}$ are each of the formula $H_2C\!=\!CH\!-\!O\!-\!(CH_2)_4\!-\!$.

In another specific embodiment, $R_1$ and $R_{1'}$ are each of the formula $H_2C\!=\!CH\!-\!CO\!-\!(CH_2)_2\!-\!O\!-\!(CH_2)_2\!-\!$.

In yet another specific embodiment, $R_1$ and $R_{1'}$ are each of the formula $H_2C=CH-CO-O-(CH_2)_2-$.

In still another specific embodiment, $R_1$ and $R_{1'}$ are each of the formula $H_2C=CH-CO-O-(CH_2)_2-[O-CO-(CH_2)_5]_2-$.

In another specific embodiment, the formulas for $R_1$ and $R_{1'}$ are described in paragraphs [0061-0062] of U.S. Patent Application Pub. No. 2007/0123606, the disclosure of which is incorporated herein by reference in its entirety.

In one specific embodiment, $R_2$ and $R_{2'}$ are each groups of the formula $-C_{34}H_{56+a}-$ and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula described in paragraph [0063] of U.S. Patent Application Pub. No. 2007/0123606.

In one specific embodiment, $R_3$ is an ethylene ($-CH_2CH_2-$) group.

In one specific embodiment, n is 1 or 2.

In a specific embodiment, the compound is of the formula described in paragraph [0066] of U.S. Patent Application Pub. No. 2007/0123606.

Additional specific examples of materials of this formula include those of the formula described in paragraph [0067] of U.S. Patent Application Pub. No. 2007/0123606.

Also disclosed herein is a phase change ink comprising an optional colorant, an initiator, and a phase change ink vehicle or carrier, wherein the carrier may comprise a compound of the formula herein described.

The compound of the formula $R_1-O-[CO-R_2-CO-NH-R_3-NH]_n-CO-R_2-CO-O-R_{1'}$ may also be present in the phase change ink in any desired or effective amount, in one embodiment at least about 5 percent by weight of the ink carrier, in another embodiment at least about 7.5 percent by weight of the ink carrier, and in yet another embodiment at least about 10 percent by weight of the ink carrier, and in one embodiment no more than about 50 percent by weight of the ink carrier, in another embodiment no more than about 40 percent by weight of the ink carrier, and in yet another embodiment no more than about 30 percent by weight of the ink carrier, although the amount can be outside of these ranges.

The materials disclosed herein can, in at least some embodiments, act as an organic gellant in the ink to control the viscosity of the ink within a desired temperature range. In particular, the gellant can in some embodiments form a semisolid gel in the ink vehicle at temperatures below the specific temperature at which the ink is jetted.

The ink vehicle is present in the phase change ink in any desired or effective amount, in one embodiment of at least about 0.1 percent by weight of the ink, in another embodiment of at least about 50 percent by weight of the ink, in yet another embodiment of at least about 70 percent by weight of the ink, and in still another embodiment of at least about 90 percent by weight of the ink, and in one embodiment of no more than about 97 percent by weight of the ink, in another embodiment of no more than about 95 percent by weight of the ink, and in yet another embodiment of no more than about 85 percent by weight of the ink, although the amount can be outside of these ranges.

Examples of free radical initiators to be included in the ink for curing include, for example, benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, benzophenone, 2-benzyl-2-(dimethylamino)-1-(4-(4-morpholinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, and the like, as well as mixtures thereof. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyl-diphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959), 2-benzyl 2-dimethylamino 1-(4-morpholinophenyl)butanone-1 (available as Ciba IRGACURE 369), 2-hydroxy-1-(4-(4-(2-hydroxy-2-methylpropionyl)-benzyl)-phenyl)-2-methylp-ropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the ink, and in another embodiment at least about 1 percent by weight of the ink, and in one embodiment no more than about 15 percent by weight of the ink, and in another embodiment no more than about 10 percent by weight of the ink, although the amount can be outside of these ranges.

The composition may also include at least one curable wax. A wax is solid at room temperature, specifically at 25° C. Inclusion of the wax thus may promote an increase in viscosity of the composition as it cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

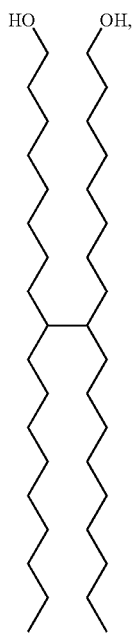

as well as other branched isomers that may include unsaturations and cyclic groups, available from Uniqema, New Castle, Del.; further information on $C_{36}$ dimer diols of this type is disclosed in, for example, "Dimer Acids," Kirk-Othmer, *Kirk-Othmer Encyclopedia of Chemical Technology*, Vol. 8, 4$^{th}$ Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COOH$, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

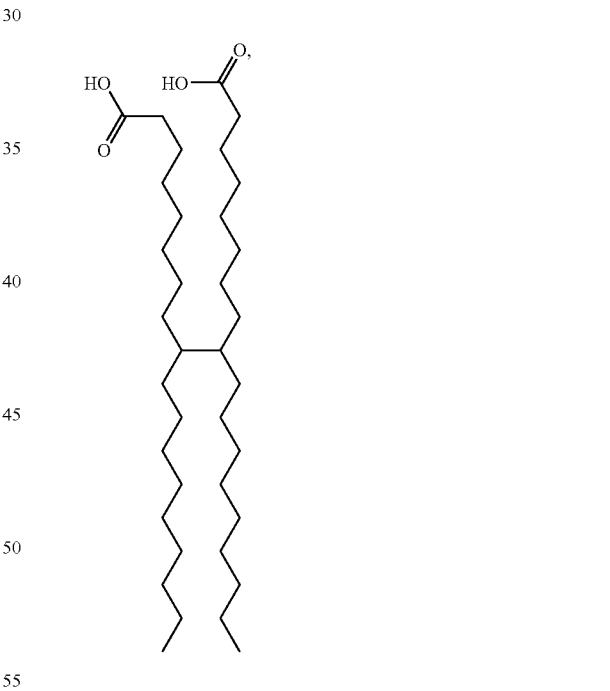

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1993), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

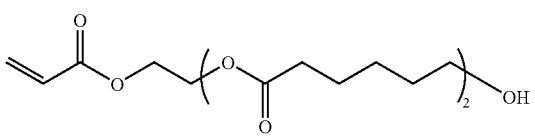

SR495B from Sartomer Company, Inc.;

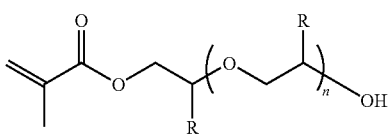

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

The radiation curable phase change inks can also optionally contain an antioxidant. The optional antioxidants can protect the images from oxidation and can also protect the ink components from oxidation during the heating portion of the ink preparation process. Specific examples of suitable antioxidant stabilizers include NAUGARD 524, NAUGARD 635, NAUGARD A, NAUGARD 1-403, and NAUGARD 959, commercially available from Crompton Corporation, Middlebury, Conn.; IROANOX 1010 and IRGASTAB UV 10, commercially available from Ciba Specialty Chemicals; GENORAD 16 and GENORAD 40 commercially available from Rahn A G, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The phase change inks may also optionally contain a colorant. Any desired or effective colorant can be employed, including dyes, pigments, mixtures thereof, and the like, provided that the colorant can be dissolved or dispersed in the ink vehicle. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red $H_{8B}$ (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASE); and carbon blacks such as REGAL 330. (Cabot), Carbon Black 5250, Carbon Black 5750 (Columbia Chemical), and the like, as well as mixtures thereof.

In another specific embodiment, the colorant is a curable olefin colorant such as those disclosed in U.S. Pat. No. 6,870,063, U.S. Pat. No. 6,870,062, U.S. Pat. No. 6,787,658, and U.S. Patent Application Publication 2004/0142995, the disclosures of each of which are hereby incorporated herein in their entirety by reference.

The colorant is present in the phase change ink in any desired or effective amount to obtain the desired color or hue, in one embodiment at least about 0.1 percent by weight of the ink, and in another embodiment at least about 0.2 percent by weight of the ink, and in one embodiment no more than about 15 percent by weight of the ink, and in another embodiment no more than about 8 percent by weight of the ink, although the amount can be outside of these ranges.

The radiation curable phase change inks can also, if desired, contain additives to take advantage of the known functionality associated with such additives. Such additives may include, for example, surfactants, defoamers, slip and leveling agents, pigment dispersants, and the like, as well as mixtures thereof. The inks can also include additional monomeric or polymeric materials as desired.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20 to about 25° C.). The inks are solid at ambient temperature.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., in another embodiment no higher than about 110° C., and in another embodiment no higher than about 130° C. (although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

Curable inks containing gellants may be jetted in any suitable manner. The ink compositions generally have melt viscosities at the jetting temperature (in one embodiment no higher than about 120° C.) in one embodiment of no more than about 30 centipoise, although the melt viscosity can be outside this range.

In embodiments, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink, from liquid to solid, may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

It has been found that optimum transfer efficiency from an intermediate transfer surface to a final recording sheet and optimum print quality can be achieved if the viscosity of the ink image deposited on the intermediate transfer member is greatly increased after jetting the ink, so as to obtain a stable and transferable image that will not smear. A suitable gelling agent for the ink will gel the monomers/oligomers in the ink vehicle quickly and reversibly and will demonstrate a narrow phase change transition, for example within a temperature range of from about 30° C. to about 100° C., such as of from about 30° C. to about 70° C., although the transition range can be outside of these temperature ranges. The gel state of the ink in one specific embodiment exhibits a minimum of $10^{2.5}$ centipoise, and in another specific embodiment $10^3$ centipoise, increase in viscosity at transferring temperatures, in one specific embodiment from about 30 to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The gel phase viscosity can vary with the print process. For example, higher viscosities are advantageously employed when using intermediate transfer techniques, or when jetting directly to porous paper in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed onto an intermediate transfer member and subsequently transferred to a final substrate, the viscosity of the ink may increase to about $10^6$ centipoise or greater at the intermediate transfer member temperature to facilitate adhesion to the intermediate transfer member, and for printing applications wherein the ink is printed directly onto a final substrate, the viscosity of the ink may increase to $10^6$ centipoise or greater at the final substrate temperature to prevent the ink from soaking into the final substrate and/or to facilitate adhesion to the final substrate until curing by exposure to radiation. In embodiments, the temperature of the intermediate transfer member or the final substrate onto which the ink is printed and at which the ink viscosity increases to about $10^6$ centipoise or greater is about 50° C. or lower.

The inks can be employed in an apparatus for direct printing ink jet processes and in indirect (offset) printing ink jet applications. Another embodiment is directed to a process which comprises incorporating the ink into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like.

At least some embodiments of the gellant materials disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In embodiments, the temperature at which the ink forms the gel state is any temperature below the jetting temperature of the ink, in one embodiment any temperature that is about 5° C. or more below the jetting temperature of the ink. In another embodiment, the gel state can be formed at a temperature of at least 25° C. In another embodiment, the gel state can be formed at a temperature of no more than 100° C.

Any suitable substrate or recording sheet can be employed, including plain papers such as XEROX 4024 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, and the like, transparency materials, fabrics, textile products, plastics, polymeric films, inorganic substrates such as metals and wood, and the like.

While the jetted ink is in a gel state, and prior to curing, the particle materials, such as magnetite powder, metallic or other specialty pigments, white pigments, or other large size particles as disclosed herein, can be added. The gel state of the ink allows the particle materials to stick to or embed within the ink, while the excess particle materials will not stick to, and are easily removable from, the portions of the substrate not having ink.

As the particles to be applied to the substrate herein, particles having a size of, for example, about 250 nm or larger, such as 500 nm or larger, 1 μm or larger, 2-5 μm, or 5 μm or larger are contemplated.

MICR readable particles must be magnetic, but the process is not limited to magnetic particles, such as magnetite (frequently 0.5 μm or larger, such as 1 μm or larger, or 2-1 μm), and can use non-magnetic particles such as titanium dioxide pigments and other pigments that must be large (approximately 300 nm, particularly 250 nm or larger), Clariant Orange H5G70 (PR 62), and metal flake pigments such as aluminum or bronze-gold (Cu—Zn alloy).

Particle materials can comprise about 10 wt % or more of the ink, particularly about 20 wt % or more, more particularly 30 wt % or more, particularly 10-80 wt %, more particularly 20-70%.

To achieve desired image density and color robustness, certain particles and pigments must be present in high loading percentages (such as 20 wt % or higher, 30 wt % or higher, or 50 wt % or higher, 60 wt % or higher, or 70 wt % or higher), and while high loading percentages are not applicable to conventional ink jetting apparatus, the present process can readily utilize conventional ink jetting apparatus and still achieve the necessary high loading percentages.

The particle materials can be treated or encapsulated to increase wetting in the ink or to passivate the surface against interference with the curing step. The treatments can include a polymeric shell, an organic dispersing agent, a crosslinked resin or a modified gelatin coating.

Addition of flow aids such as silica or stearate salts to powder formed of the particle materials is also possible. The flow aids decrease clumping and aggregation of the particle materials to one another, thereby allowing for more uniform application and greater absorbance with the ink.

The particle materials may be coated with a wax to prevent the development of explosive conditions when the use of a liquid vehicle is not desired. For example, metal pigments could be coated with an acrylate wax already in use in UV radically curable inks. In cationic systems, a low melting reactive solid such as cis[[[4-(ethenyloxy)methyl]cyclohexyl]methyl]terephthalate, bis-(4-vinyl oxy butyl)hexamethylenediurethane, or poly(bisphenol A-co-epichlorohydrin)glycidyl end-capped could be used.

In embodiments, the particle materials are sealed within the ink after application by curing the ink, then at least one additional layer of curable ink is jetted onto the initial layer containing the particle materials, then further cured to effect additional sealing of the particle materials within the ink on the substrate. The additional layer of curable ink may, but does not necessarily, comprise the same ink as the first layer.

In embodiments, the particle material is a magnetic material that allows the image to be readable by a conventional MICR reading device. Thus, the addition of the magnetic material after jetting of the ink allows the image to be formed precisely and rapidly via conventional jetting, therefore not requiring dramatic alteration of the jetting apparatus or drastic decrease in the functional life of the jetting apparatus, while still allowing a MICR image to be formed containing magnetic particles large enough to retain a sufficient magnetic charge to be easily readable by conventional MICR reading devices.

The particle materials may be held in a storage device prior to being applied to the ink on the substrate.

Contemplated herein is also a system for automated ink jetting as well as automatic application of particles, removal of excess particles, and possibly including a system for automatically embedding the particles within the jetted ink.

In embodiments, the system includes a device for forming an image on a substrate comprising an ink jet device, followed in line by a device to apply particles, optionally followed in line by a device to remove excess particles, followed in line by a device to effect cure of ink. In embodiments, the system includes a device for forming an image on a substrate comprising an ink jet device, followed in line by a device to apply particles, followed in line by a device to effect cure of ink, and optionally followed in line by a device to remove excess particles.

The particle materials may be added from a storage device by any known method, including static electric rollers, sifting or dropping apparatus, magnetic devices, forced air propulsion apparatus, and other known techniques.

The excess particle materials not embedded within the jetted ink in the gel or cured state can be removed by any known method, including forced air, magnetic force, static electric force, or simply physical or gravitational removal.

The excess particles, after removal, may be returned to a storage device to be re-applied to later-jetted inks on substrates. In this way, the particle materials that are not embedded within the jetted ink are not wasted.

Well known techniques and devices used in magnetic delivery systems, such as those commonly employed in pickup and transport of magnetic carrier in two component magnetic electrophotographic development systems, can be employed to both lay down the particle materials and remove the particle materials that do not embed in the ink. Thus, in embodiments, the particle materials can be delivered to the substrate by a magnetic roll that picks up the particle materials from a storage device onto the roll, trims it to form a layer of particle compound of required thickness on the roll, then deposits it on the substrate. In a later step, excess particle materials not stuck to the ink image can be removed by a second magnetic roll, returned to the storage device and then to the first magnetic roll for reuse.

Further contemplated embodiments also incorporate a method or device for enhancing penetration of the particle materials into the ink through the use of magnetic force or centrifugal force or another force or combination of forces capable of driving the particles into the ink forming an image on a substrate.

The ink may also be heated after application of the particle materials to further enhance penetration of the particle materials into the ink. This heating may be accomplished independently or in combination with use of the force or combination of forces described above for enhancing penetration of the particle materials into the ink.

A use of a magnetic field or centrifugal force may be employed to achieve greater penetration of the particle materials into the jetted ink. The magnetic force may either be used to repel the particles away from the source of the force and into the ink, or may be used from the opposite side to pull the particles toward the source of the force and into the ink. Centrifugal force could be applied by moving the substrate and ink in a circular motion, rotating the substrate so that the centrifugal force would pull the particles further into the ink and toward the substrate.

The contemplated system thus may further include a device for further embedding the particles in the jetted ink prior to curing. The device for further embedding the particles in the jetted ink may comprise a device for heating the ink, a device using a force such as centrifugal force or magnetic force, or a device using a combination of these techniques.

Over-coating or encapsulating the particle compound/ink mixture with one or more layers of ink prior to or after curing of the initial layer to further ensure stability of the particle materials within the ink is also possible.

The one or more additional layers of ink can comprise colorless ink or ink containing at least one colorant.

Curing of the one or more layers of ink may be accomplished by any known method, including radiation curing. Radiation curing includes all forms of curing upon exposure to a radiation source, including (but not limited to) light and heat sources and including in the presence or absence of initiators. Examples of radiation curing include ultraviolet (UV) light, for example having a wavelength of from about 200 to about 400 nanometers, visible light, or the like, optionally in the presence of photoinitiators and/or sensitizers, e-beam radiation, optionally in the presence of photoinitiators, thermal curing, optionally in the presence of high temperature thermal initiators (and which may be largely inactive at the jetting temperature when used in phase change inks), and appropriate combinations thereof.

The contemplated system includes a device for curing the one or more layers of ink, such as a radiation source that applies a radiation to the ink to effect cure. The radiation source may be as detailed above.

EXAMPLE

A colorless UV ink formulation comprising 7.5 wt % amide gellant (the gellant being fully described in Example 2 of U.S. Pat. No. 7,279,587, the entire disclosure of which is fully incorporated herein by reference), 5.0 wt % UNILIN 350-acrylate, 1.0 wt % IRGACURE 819, 3.5 wt % IRGACURE 127, 0.2 wt % IRGASTAB UV10, 5.0 wt % SR399LV, 77.8 wt % SR9003 was used to make a K-Proof image.

The K-Proofer used has three rectangular gravure patterns each approximately 9.4×4.7 cm. The cell density of the first rectangle is nominally 100%, the second 80%, and the third 60%. In practice this K-proof plate results in films (or pixels) of about 5 microns in thickness (or height). The weight of the deposited ink after coating a Mylar sheet (Xerox Universal Clear Transparencies part # R4446) was 0.323 g. The UV gel image was then sprinkled with magnetite particles (TODA (Japan) MTH-009F) that had been sieved through a 230 mesh screen. The pile of magnetite was shaken off. The higher cell density rectangles appeared slightly darker than the low density patterns. The total weight of magnetite deposited on the gel was 0.309 g. Thus, the "loading" is about 90 wt % of the ink forming the image.

Curing was attempted using a UV Fusion Light Hammer 6 operated at full power and employing a UV "D" bulb; the samples were passed under the lamp at 32 ft/min using a LC-6 Benchtop Conveyor. The ink treated with the magnetite experienced a partial cure, increasing in viscosity and becoming gummy. Under the same cure conditions, the same UV ink without magnetite cured to a hard film. Decreasing the load % of particle compound below 90 wt % would presumably result in a more complete cure. Alternately, increasing the IRGACURE 819 (low-light sensitive phosphine oxide) content would also likely increase the curing capability of the ink after reception of the particle materials.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of forming an image, the method comprising:
    forming a pattern of the image on a substrate by jetting a curable ink containing a gellant onto the substrate, wherein the curable ink at jetting is at a temperature above a gel temperature of the curable ink,
    cooling the curable ink of the pattern to below the gel temperature of the curable ink,
    following the cooling, applying at least one particulate material to the cooled ink, and
    following the applying, curing the cooled ink.

2. The method of claim 1, wherein the curable ink is a UV curable ink.

3. The method of claim 1, wherein the gellant is a curable amide gellant.

4. The method of claim 1, wherein the at least one particulate material is a magnetic material, a pigment greater that 250 nm in size, or a metal flake pigment.

5. The method of claim 1, wherein the particulate material is a magnetic particulate material, and wherein the curable ink containing a gellant and the particulate material form an image readable by a MICR reading apparatus.

6. The method of claim 1, the method further comprising:
    removing excess particulate material from the substrate and the cooled ink prior to or after the curing step.

7. The method of claim 1, wherein the curable ink further comprises at least one colorant.

8. The method of claim 1, the method further comprising:
    forming at least one additional layer of a curable ink over the pattern of the image formed by the curable ink containing a gellant and the particulate material after the curing, and
    curing the at least one additional curable ink.

9. The method of claim 1, the method further comprising:
    forming at least one additional layer of a curable ink over the pattern of the image formed by the curable ink containing a gellant and the particulate material prior to the curing step.

10. The method of claim 1, wherein the curable ink further comprises at least one curable wax.

11. The method of claim 1, wherein the particulate material is penetrated into the cooled ink through the application of a magnetic field or centrifugal force.

12. The method of claim 1, wherein the substrate is paper, Mylar, cardboard, particle board, card paper, plastic, metal, a metal alloy, or a treated substrate.

13. The method of claim 1, wherein the curable ink containing a gellant is jetted at a temperature of from about 40° C. to about 130° C.

14. The method of claim 1, wherein the gel temperature of the curable ink containing the gellant is about 5° C. or more below the temperature at jetting.

15. The method of claim 1, wherein the gel temperature of the curable ink containing the gellant is from about 25° C. to about 80° C.

16. The method of claim 1, wherein the forming a pattern of the image on a substrate by jetting a curable ink containing a gellant onto the substrate comprises forming a pattern of the image by jetting the curable ink containing a gellant onto an intermediate transfer surface, then transferring the pattern of the image to the substrate.

17. An image formed by a process comprising:
    forming a pattern of an image on a substrate by jetting a curable ink containing a gellant onto the substrate, wherein the curable ink at jetting is at a temperature above a gel temperature of the curable ink,
    cooling the curable ink of the pattern to below the gel temperature of the curable ink,
    following the cooling, applying a magnetic particulate material to the cooled ink, and
    following the applying, curing the cooled ink.

18. The image of claim 17, the process further comprising:
    jetting a second layer of curable ink over the image comprised of curable ink containing a gellant and magnetite particulate material and curing the second layer of curable ink.

19. The image of claim 17 where the image was formed by jetting the curable ink containing a gellant onto an intermediate transfer surface, then transferring the pattern of the image to the substrate.

* * * * *